United States Patent
Murakami

(10) Patent No.: US 11,153,446 B2
(45) Date of Patent: Oct. 19, 2021

(54) INFORMATION PROCESSING APPARATUS FOR PRESENTING AN OBJECT FOR A BATCH OPERATION WITHOUT SELECTION IN ADVANCE AND NON-TRANSITORY COMPUTER READABLE MEDIUM

(71) Applicant: FUJIFILM Business Innovation Corp., Tokyo (JP)

(72) Inventor: Ryosuke Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/858,692

(22) Filed: Apr. 26, 2020

(65) Prior Publication Data
US 2021/0120134 A1    Apr. 22, 2021

(30) Foreign Application Priority Data
Oct. 18, 2019 (JP) .............................. JP2019-191398

(51) Int. Cl.
*G06F 3/12* (2006.01)
*H04N 1/00* (2006.01)
*G06F 3/0482* (2013.01)

(52) U.S. Cl.
CPC ..... *H04N 1/00222* (2013.01); *H04N 1/00413* (2013.01); *H04N 1/00854* (2013.01); *H04N 1/00875* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 7,313,340 B2 * | 12/2007 | Savitzky ................ | G03G 15/36 399/81 |
| 8,368,938 B2 * | 2/2013 | Sato .................... | H04N 1/00233 358/1.16 |
| 8,446,652 B2 * | 5/2013 | Curtis ................ | H04N 1/32101 358/505 |
| 8,666,970 B2 * | 3/2014 | Albrecht ............. | G06F 16/2453 707/719 |
| 2008/0215413 A1 * | 9/2008 | Barnard ............ | G06Q 10/0633 705/7.15 |
| 2010/0053698 A1 * | 3/2010 | Honda ............... | H04N 1/00225 358/471 |
| 2012/0092717 A1 * | 4/2012 | Saitoh .................. | G06F 3/1267 358/1.15 |
| 2014/0279825 A1 * | 9/2014 | Shukla .................... | G06F 16/93 707/601 |

(Continued)

FOREIGN PATENT DOCUMENTS

JP    2008112279    5/2008

*Primary Examiner* — Dung D Tran
(74) *Attorney, Agent, or Firm* — JCIPRNET

(57) ABSTRACT

An information processing apparatus includes a processor configured to: select an object which is a transmission candidate using (i) attributes of objects managed in a project including plural processes and (ii) an attribute of a user who instructs an operation relating to transmission of an object, generate, for the object which is the transmission candidate, image information obtained by imaging transmission information used for the transmission of the object, and output the generated image information.

12 Claims, 20 Drawing Sheets

(56) References Cited

U.S. PATENT DOCUMENTS

2015/0379472 A1* 12/2015 Gilmour ............... G06Q 10/06
                                                         705/7.15
2016/0050322 A1*  2/2016 Ito ..................... H04N 1/00233
                                                         358/1.15

* cited by examiner

FIG. 1

| PROJECT ID | PROJECT NAME | PERSON IN CHARGE | SCHEDULED COMPLETION DATE | | PLANNING | | | DEVELOPMENT | | | | EVALUATION | | | | | RELEASE | |
|---|---|---|---|---|---|---|---|---|---|---|---|---|---|---|---|---|---|---|
| | | | | | DEVELOPMENT PLAN DOCUMENT | TASK MANAGEMENT TABLE | | BASIC DESIGN DOCUMENT | DETAILED DESIGN DOCUMENT | REVIEW RESULT REPORT | | TEST PLAN DOCUMENT | TEST DESIGN DOCUMENT | TEST REVIEW RESULT REPORT | TEST RESULT REPORT | QUALITY INSPECTION DOCUMENT | | RELEASE PREPARATION COMPLETION REPORT | RELEASE APPROVAL DOCUMENT |
| A0001 | DOCUMENT MANAGEMENT SYSTEM DEVELOPMENT | USER A | 8/3/2019 | >> | ▣ | ▣ | >> | ▣ | ▣ | ▣ | >> | ▣ | ▣ | ▣ | ▣ | ▢ | >> | ▢ | ▢ |
| A0002 | WORKFLOW SYSTEM DEVELOPMENT | USER B | 9/13/2019 | >> | ▣ | ▣ | >> | ▣ | ▣ | ▣ | >> | ▣ | ▢ | ▢ | ▢ | ▢ | >> | ▢ | ▢ |
| A0003 | ORDERING AND ORDER RECEIVING SYSTEM DEVELOPMENT | USER C | 9/20/2019 | >> | ▣ | ▣ | >> | ▢ | ▢ | ▢ | >> | ▢ | ▢ | ▢ | ▢ | ▢ | >> | ▢ | ▢ |
| A0004 | PRINTER DRIVER DEVELOPMENT | USER D | 8/20/2019 | >> | ▣ | ▣ | >> | ▢ | ▢ | ▢ | >> | ▢ | ▢ | ▢ | ▢ | ▢ | >> | ▢ | ▢ |
| A0005 | DRAWING OUTPUT SERVICE DEVELOPMENT | USER E | 8/6/2019 | >> | ▣ | ▣ | >> | ▣ | ▣ | ▣ | >> | ▣ | ▣ | ▣ | ▣ | ▢ | >> | ▢ | ▢ |

FIG. 2

| PROJECT ID | PROJECT NAME | PERSON IN CHARGE | SCHEDULED COMPLETION DATE | | PLANNING | | | DEVELOPMENT | | |
|---|---|---|---|---|---|---|---|---|---|---|
| | | | | | DEVELOPMENT PLAN DOCUMENT | TASK MANAGEMENT TABLE | | BASIC DESIGN DOCUMENT | DETAILED DESIGN DOCUMENT | REVIEW RESULT REPORT |
| A0001 | DOCUMENT MANAGEMENT SYSTEM DEVELOPMENT | USER A | 8/3/2019 | >> | 📄 | 📄 | >> | 📄 | 📄 | 📄 |
| A0002 | WORKFLOW SYSTEM DEVELOPMENT | USER B | 9/13/2019 | >> | 📄 | 📄 | >> | ▫ | ▫ | ▫ |
| A0003 | ORDERING AND ORDER RECEIVING SYSTEM DEVELOPMENT | USER C | 9/20/2019 | >> | 📄 | 📄 | >> | ▫ | ▫ | ▫ |
| A0004 | PRINTER DRIVER DEVELOPMENT | USER D | 8/20/2019 | >> | 📄 | 📄 | >> | 📄 | 📄 | 📄 |
| A0005 | DRAWING OUTPUT SERVICE DEVELOPMENT | USER E | 8/6/2019 | >> | 📄 | 📄 | >> | 📄 | 📄 | 📄 |

DETAIL SCREEN OF PROJECT

OPERATION

| BATCH DOWNLOAD | COVER SHEET BATCH CREATION | ... |

ATTRIBUTE INFORMATION

| ATTRIBUTE NAME | VALUE |
|---|---|
| STATE | DURING EXECUTION |
| STATUS | GREEN |
| IN CHARGE OF DEVELOPMENT | USER F |
| IN CHARGE OF EVALUATION | USER G |
| SCHEDULED DEVELOPMENT COMPLETION DATE | 07/20/2019 |
| SCHEDULED EVALUATION COMPLETION DATE | 08/20/2019 |
| ... | |

FIG. 3

[DEVELOPMENT JOB][A0002][TEST REVIEW RESULT REPORT]

| JOB NAME | DEVELOPMENT JOB |
|---|---|
| PROJECT ID | A0002 |
| DOCUMENT TYPE | TEST REVIEW RESULT REPORT |
| YEAR | 2019 |
| OUTSOURCING COMPANY | A COMPANY |

○ HOW TO USE
1. PUT THIS SHEET ON TOP OF DOCUMENT YOU WANT TO REGISTER.
2. SELECT "COVER SHEET REGISTRATION" FROM MULTI-FUNCTION MACHINE AND EXECUTE SCANNING.

WHEN REGISTERING MULTIPLE DOCUMENT TYPES, MULTIPLE DOCUMENT TYPES CAN BE REGISTERED IN A BATCH BY SETTING A COVER SHEET AND A DOCUMENT AS ONE SET AND SCANNING MULTIPLE BUNDLES OF THE COVER SHEETS AND DOCUMENTS.

| USER ID | USER NAME | GENDER | AFFILIATED DEPARTMENT | POSITION | AFFILIATED GROUP |
|---|---|---|---|---|---|
| U0001 | USER A | MALE | EVALUATION DEPARTMENT | GENERAL STAFF | EVALUATION 1G |
| U0002 | USER B | FEMALE | MANUFACTURING DEPARTMENT | MANAGER | MANUFACTURING 2G |
| U0003 | USER C | MALE | DESIGN DEPARTMENT | GENERAL STAFF | DESIGN 1G |

| OBJECT TYPE | OPERATION TYPE | EXECUTABLE CONDITION |
|---|---|---|
| TEST PLAN DOCUMENT | COVER SHEET CREATION | PERSON IN CHARGE OF PLANNING PROCESS OR HAVE AUTHORITY OF MANAGER OR MORE |
| TEST PLAN DOCUMENT | DOWNLOAD | PERSON IN CHARGE OF PLANNING PROCESS OR HAVE AUTHORITY OF MANAGER OR MORE |
| TASK MANAGEMENT TABLE | COVER SHEET CREATION | PERSON IN CHARGE OF PLANNING PROCESS OR HAVE AUTHORITY OF MANAGER OR MORE |
| TASK MANAGEMENT TABLE | DOWNLOAD | PERSON IN CHARGE OF PLANNING PROCESS OR HAVE AUTHORITY OF MANAGER OR MORE |

| PROJECT ID | ATTRIBUTE INFORMATION | STEP | OPERATION |
|---|---|---|---|
| A0001 | PROJECT NAME: DOCUMENT MANAGEMENT SYSTEM DEVELOPMENT<br>PERSON IN CHARGE: USER A<br>SCHEDULED COMPLETION DATE: 8/3/2019<br>STATE: DURING EXECUTION | PLANNING, DEVELOPMENT, EVALUATION, RELEASE | EDITING<br>BATCH DOWNLOAD<br>COVER SHEET BATCH CREATION<br>CREATION OF FORM |
| A0002 | PROJECT NAME: WORKFLOW SYSTEM DEVELOPMENT<br>PERSON IN CHARGE: USER B<br>SCHEDULED COMPLETION DATE: 9/13/2019<br>STATE: DURING EXECUTION | PLANNING, DEVELOPMENT, EVALUATION, RELEASE | EDITING<br>BATCH DOWNLOAD<br>COVER SHEET BATCH CREATION<br>CREATION OF FORM |

| PROJECT ID | STEP | ATTRIBUTE INFORMATION | DOCUMENT TYPE | OPERATION |
|---|---|---|---|---|
| A0002 | PLANNING | STATE: COMPLETED<br>PERSON IN CHARGE:<br>USER B | DEVELOPMENT PLAN DOCUMENT<br>TASK MANAGEMENT TABLE | EDITING<br>BATCH DOWNLOAD<br>COVER SHEET BATCH CREATION |
| A0002 | DEVELOPMENT | STATE: COMPLETED<br>PERSON IN CHARGE:<br>USER F | BASIC DESIGN DOCUMENT<br>DETAILED DESIGN DOCUMENT<br>REVIEW RESULT REPORT | EDITING<br>BATCH DOWNLOAD<br>COVER SHEET BATCH CREATION |
| A0002 | EVALUATION | STATE: DURING<br>EXECUTION<br>PERSON IN CHARGE:<br>USER G | TEST PLAN DOCUMENT<br>TEST DESIGN DOCUMENT<br>TEST REVIEW RESULT REPORT<br>TEST RESULT REPORT<br>QUALITY INSPECTION DOCUMENT | EDITING<br>BATCH DOWNLOAD<br>COVER SHEET BATCH CREATION |
| A0002 | RELEASE | STATE: BEFORE<br>EXECUTION<br>PERSON IN CHARGE:<br>USER B | RELEASE PREPARATION<br>COMPLETION REPORT<br>RELEASE APPROVAL DOCUMENT | EDITING<br>BATCH DOWNLOAD<br>COVER SHEET BATCH CREATION |

| PROJECT ID | STEP | DOCUMENT TYPE | ATTRIBUTE INFORMATION | OPERATION | DOCUMENT |
|---|---|---|---|---|---|
| A0002 | PLANNING | DEVELOPMENT PLAN DOCUMENT | DEGREE OF NECESSITY: REQUIRED | COVER SHEET CREATION UPLOAD | DEVELOPMENT PLAN DOCUMENT.doc |
| A0002 | PLANNING | TASK MANAGEMENT TABLE | DEGREE OF NECESSITY: REQUIRED | COVER SHEET CREATION UPLOAD | TASK MANAGEMENT TABLE_20190910.xlsx |
| A0002 | DEVELOPMENT | BASIC DESIGN DOCUMENT | DEGREE OF NECESSITY: REQUIRED | COVER SHEET CREATION UPLOAD | BASIC DESIGN DOCUMENT.md |
| A0002 | DEVELOPMENT | DETAILED DESIGN DOCUMENT | DEGREE OF NECESSITY: REQUIRED | COVER SHEET CREATION UPLOAD | DOCUMENT MANAGEMENT FUNCTION DESIGN DOCUMENT.md USER MANAGEMENT FUNCTION DESIGN DOCUMENT.md |
| A0002 | DEVELOPMENT | REVIEW RESULT REPORT | DEGREE OF NECESSITY: REQUIRED | COVER SHEET CREATION UPLOAD | DESIGN-CODE REVIEW RESULT REPORT.xlsx |
| A0002 | EVALUATION | TEST PLAN DOCUMENT | DEGREE OF NECESSITY: REQUIRED | COVER SHEET CREATION UPLOAD | TEST PLAN DOCUMENT.doc |
| A0002 | EVALUATION | TEST DESIGN DOCUMENT | DEGREE OF NECESSITY: OPTIONAL | COVER SHEET CREATION UPLOAD | |
| A0002 | EVALUATION | TEST REVIEW RESULT REPORT | DEGREE OF NECESSITY: REQUIRED | COVER SHEET CREATION UPLOAD | |
| A0002 | EVALUATION | TEST RESULT REPORT | DEGREE OF NECESSITY: REQUIRED | COVER SHEET CREATION UPLOAD | |
| A0002 | EVALUATION | QUALITY INSPECTION DOCUMENT | DEGREE OF NECESSITY: REQUIRED | COVER SHEET CREATION UPLOAD | |
| A0002 | RELEASE | RELEASE PREPARATION COMPLETION REPORT | DEGREE OF NECESSITY: REQUIRED | COVER SHEET CREATION UPLOAD | |
| A0002 | RELEASE | RELEASE APPROVAL DOCUMENT | DEGREE OF NECESSITY: REQUIRED | COVER SHEET CREATION UPLOAD | |

| PROJECT ID | STEP | DOCUMENT TYPE | DOCUMENT | APPROVAL STATE | OPERATION |
|---|---|---|---|---|---|
| A0002 | PLANNING | DEVELOPMENT PLAN DOCUMENT | DEVELOPMENT PLAN DOCUMENT.doc | APPROVED | DOWNLOAD, DELETE, UPDATE |
| A0002 | PLANNING | TASK MANAGEMENT TABLE | TASK MANAGEMENT TABLE_20190910.xlsx | — | DOWNLOAD, DELETE, UPDATE |
| A0002 | DEVELOPMENT | BASIC DESIGN DOCUMENT | BASIC DESIGN DOCUMENT.md | APPROVED | DOWNLOAD, DELETE, UPDATE |
| A0002 | DEVELOPMENT | DETAILED DESIGN DOCUMENT | DOCUMENT MANAGEMENT FUNCTION DESIGN DOCUMENT.md | APPROVED | DOWNLOAD, DELETE, UPDATE |
| A0002 | DEVELOPMENT | DETAILED DESIGN DOCUMENT | USER MANAGEMENT FUNCTION DESIGN DOCUMENT.md | APPROVED | DOWNLOAD, DELETE, UPDATE |
| A0002 | DEVELOPMENT | REVIEW RESULT REPORT | DESIGN-CODE REVIEW RESULT REPORT.xlsx | APPROVED | DOWNLOAD, DELETE, UPDATE |
| A0002 | EVALUATION | TEST PLAN DOCUMENT | TEST PLAN DOCUMENT.doc | — | DOWNLOAD, DELETE, UPDATE |
| A0002 | EVALUATION | TEST DESIGN DOCUMENT | FUNCTIONAL TEST DESIGN DOCUMENT.xlsx | — | DOWNLOAD, DELETE, UPDATE |
| A0002 | EVALUATION | TEST DESIGN DOCUMENT | NON-FUNCTION TEST DESIGN DOCUMENT.xlsx | — | DOWNLOAD, DELETE, UPDATE |
| A0002 | EVALUATION | TEST REVIEW RESULT REPORT | FUNCTION TEST DESIGN REVIEW RESULT REPORT.xlsx | — | DOWNLOAD, DELETE, UPDATE |
| A0002 | EVALUATION | TEST REVIEW RESULT REPORT | NON-FUNCTION TEST DESIGN REVIEW RESULT REPORT.xlsx | — | DOWNLOAD, DELETE, UPDATE |
| A0002 | EVALUATION | TEST RESULT REPORT | TEST SCRIPT.zip | — | DOWNLOAD, DELETE, UPDATE |
| A0002 | EVALUATION | TEST RESULT REPORT | TEST RESULT REPORT.doc | — | DOWNLOAD, DELETE, UPDATE |

| BATCH OPERATION | SINGLE OPERATION |
|---|---|
| BATCH DOWNLOAD | DOWNLOAD |
| COVER SHEET BATCH CREATION | COVER SHEET CREATION |

| SINGLE OPERATION | OPERATION TARGET | SELECTION CONDITION |
|---|---|---|
| DOWNLOAD | DOCUMENT | NUMBER OF DOCUMENTS ≥ 1 |
| COVER SHEET CREATION | DOCUMENT TYPE | ["DEGREE OF NECESSITY" OF DOCUMENT TYPE IS "REQUIRED"] and [NUMBER OF DOCUMENTS STORED IN DOCUMENT TYPE = 0] and [PERSON IN CHARGE OF STEP INCLUDES LOGIN USER] |

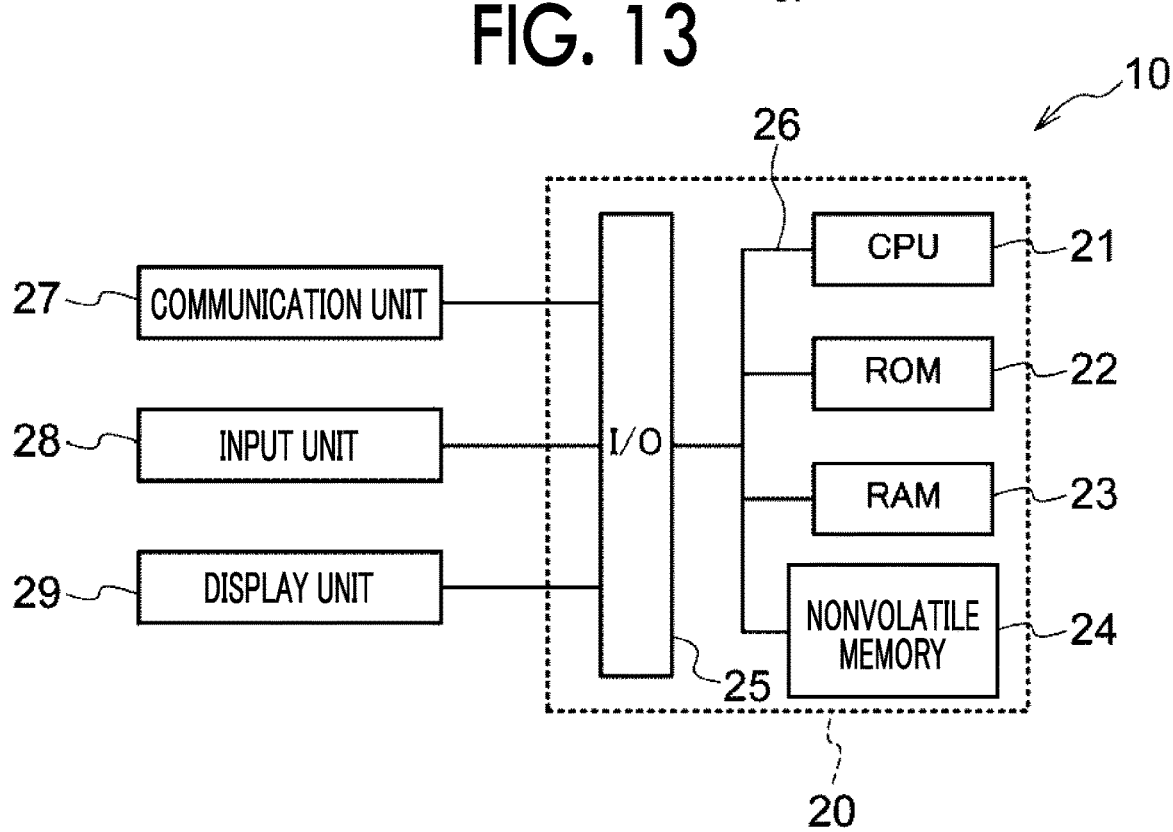

FIG. 15

COVER SHEET BATCH CREATION

| STEP | STATE | PERSON IN CHARGE | DOCUMENT TYPE | DEGREE OF NECESSITY | DOCUMENT |
|---|---|---|---|---|---|
| PLANNING | COMPLETED | USER B | DEVELOPMENT PLAN DOCUMENT (NOT AUTHORIZED) | REQUIRED | DEVELOPMENT PLAN DOCUMENT.doc |
| | | | TASK MANAGEMENT TABLE (NOT AUTHORIZED) | REQUIRED | TASK MANAGEMENT TABLE_20190910.xlsx |
| DEVELOPMENT | COMPLETED | USER F | BASIC DESIGN DOCUMENT | REQUIRED | BASIC DESIGN DOCUMENT.md |
| | | | DETAILED DESIGN DOCUMENT | REQUIRED | DOCUMENT MANAGEMENT FUNCTION DESIGN DOCUMENT.md (1 OTHER) |
| | | | REVIEW RESULT REPORT | REQUIRED | DESIGN·CODE REVIEW RESULT REPORT.xlsx (3 OTHERS) |
| EVALUATION | DURING EXECUTION | USER G | TEST PLAN DOCUMENT | REQUIRED | TEST PLAN DOCUMENT.doc |
| | | | TEST DESIGN DOCUMENT | OPTIONAL | — |
| | | | TEST REVIEW RESULT REPORT | REQUIRED | — |
| | | | TEST RESULT REPORT | REQUIRED | — |
| RELEASE | BEFORE EXECUTION | USER B | QUALITY INSPECTION DOCUMENT | REQUIRED | — |
| | | | RELEASE PREPARATION COMPLETION REPORT | REQUIRED | — |
| | | | RELEASE APPROVAL DOCUMENT | REQUIRED | — |

CREATION — 8A
CANCEL — 8B

COVER SHEET BATCH CREATION

| STEP | STATE | PERSON IN CHARGE | ☐ DOCUMENT TYPE | DEGREE OF NECESSITY | SCHEDULED STORAGE DATE | DOCUMENT |
|---|---|---|---|---|---|---|
| ☐ PLANNING | COMPLETED | USER B | ☐ DEVELOPMENT PLAN DOCUMENT (NOT AUTHORIZED) | REQUIRED | 6/20/2019 | DEVELOPMENT PLAN DOCUMENT.doc |
| | | | ☐ TASK MANAGEMENT TABLE (NOT AUTHORIZED) | REQUIRED | 6/20/2019 | TASK MANAGEMENT TABLE_20190910.xlsx |
| ☐ DEVELOPMENT | COMPLETED | USER F | ☐ BASIC DESIGN DOCUMENT | REQUIRED | 7/20/2019 | BASIC DESIGN DOCUMENT.md |
| | | | ☐ DETAILED DESIGN DOCUMENT | REQUIRED | 7/20/2019 | DOCUMENT MANAGEMENT FUNCTION DESIGN DOCUMENT.md (1 OTHER) |
| | | | ☐ REVIEW RESULT REPORT | REQUIRED | 7/20/2019 | DESIGN·CODE REVIEW RESULT REPORT.xlsx (3 OTHERS) |
| ☐ EVALUATION | DURING EXECUTION | USER G | ☐ TEST PLAN DOCUMENT | REQUIRED | 7/20/2019 | TEST PLAN DOCUMENT.doc |
| | | | ☐ TEST DESIGN DOCUMENT | OPTIONAL | 8/1/2019 | — |
| | | | ☑ TEST REVIEW RESULT REPORT | REQUIRED | 8/10/2019 | — |
| | | | ☑ TEST RESULT REPORT | REQUIRED | 8/15/2019 | — |
| | | | ☑ QUALITY INSPECTION DOCUMENT | REQUIRED | 9/1/2019 | — |
| ☐ RELEASE | BEFORE EXECUTION | USER B | ☐ RELEASE PREPARATION COMPLETION REPORT | REQUIRED | 9/10/2019 | — |
| | | | ☐ RELEASE APPROVAL DOCUMENT | REQUIRED | 9/10/2019 | — |

[CREATION] 8A
[CANCEL] 8B

FIG. 18

COVER SHEET BATCH CREATION

| ☐ STEP | ▽ | STATE | PERSON IN CHARGE | ☐ DOCUMENT TYPE | ▽ | DEGREE OF NECESSITY ▽ | SCHEDULED STORAGE DATE ▽ | DOCUMENT |
|---|---|---|---|---|---|---|---|---|
| ☐ PLANNING | | COMPLETED | USER B | ☐ DEVELOPMENT PLAN DOCUMENT (NOT AUTHORIZED) | | REQUIRED | 6/20/2019 | DEVELOPMENT PLAN DOCUMENT.doc |
| | | | | ☐ TASK M... | | RED | 6/20/2019 | TASK MANAGEMENT TABLE_20190910.xlsx |
| ☐ DEVELOPMENT | | COMPLETED | USER F | ☐ BASIC D... | | RED | 7/20/2019 | BASIC DESIGN DOCUMENT.md |
| | | | | ☐ DETAILE... | | RED | 7/20/2019 | DOCUMENT MANAGEMENT FUNCTION DESIGN DOCUMENT.md (1 OTHER) |
| | | | | ☐ REVIEW... | | RED | 7/20/2019 | DESIGN·CODE REVIEW RESULT REPORT.xlsx (3 OTHERS) |
| ☐ EVALUATION | | DURING EXECUTION | USER G | ☐ TEST PL... | | RED | 7/20/2019 | TEST PLAN DOCUMENT.doc |
| | | | | ☐ TEST D... | | NAL | 8/1/2019 | — |
| | | | | ☑ TEST R... | | RED | 8/10/2019 | — |
| | | | | ☑ TEST R... | | RED | 8/15/2019 | — |
| | | | | ☑ QUALIT... | | RED | 9/1/2019 | — |
| ☐ RELEASE | | BEFORE EXECUTION | USER B | ☐ RELEAS... | | RED | 9/10/2019 | — |
| | | | | ☐ RELEAS... | | RED | 9/10/2019 | — |

Popup (44):
- ☐ SELECT ALL
- ☑ BEFORE TODAY
- ☑ THIS MONTH
- ☐ INDIVIDUAL SELECTION
  - ☐ 06/20/2019
  - ☐ 07/20/2019
  - ☐ 08/01/2019
  - . . .

44B CANCEL | 44A OK

8A CREATION
8B CANCEL

FIG. 19

| STEP | | | | | |
|---|---|---|---|---|---|
| ☐ STATE | ▽ | PERSON IN CHARGE | ▽ | | |
| | | | ☐ DOCUMENT TYPE | ☐ DEGREE OF NECESSITY ▽ | SCHEDULED STORAGE DATE ▽ | DOCUMENT |

COVER SHEET BATCH CREATION

○ FILTERING CONDITION
1. PERSON IN CHARGE = LOGIN USER
2. SCHEDULED STORAGE DATE < TODAY and SCHEDULED STORAGE DATE = THIS MONTH

| ☐ STEP | | | | | | |
|---|---|---|---|---|---|---|
| | ☐ STATE ▽ | PERSON IN CHARGE ▽ | ☐ DOCUMENT TYPE | ☐ DEGREE OF NECESSITY ▽ | SCHEDULED STORAGE DATE ▽ | DOCUMENT |
| ☐ EVALUATION | DURING EXECUTION | USER G | ☐ TEST PLAN DOCUMENT | REQUIRED | 8/1/2019 | TEST PLAN DOCUMENT.doc |
| | | | ☐ TEST REVIEW RESULT REPORT | REQUIRED | 8/10/2019 | — |
| | | | ☑ TEST RESULT REPORT | REQUIRED | 8/15/2019 | — |

CREATION — 8A

CANCEL — 8B 42, 8C

CREATION OF NEW CASE | BATCH OPERATION ▽

| PROJECT ID | PROJECT NAME | PERSON IN CHARGE | SCHEDULED COMPLETION DATE | PLANNING – DEVELOPMENT PLAN DOCUMENT | PLANNING – TASK MANAGEMENT TABLE | DEVELOPMENT – BASIC DESIGN DOCUMENT | DEVELOPMENT – DETAILED DESIGN DOCUMENT | DEVELOPMENT – REVIEW RESULT REPORT | EVALUATION – TEST PLAN DOCUMENT | EVALUATION – TEST DESIGN DOCUMENT | EVALUATION – TEST REVIEW RESULT REPORT | EVALUATION – TEST RESULT REPORT | EVALUATION – QUALITY INSPECTION DOCUMENT | RELEASE – RELEASE PREPARATION COMPLETION REPORT | RELEASE – RELEASE APPROVAL DOCUMENT |
|---|---|---|---|---|---|---|---|---|---|---|---|---|---|---|---|
| A0001 | DOCUMENT MANAGEMENT SYSTEM DEVELOPMENT | USER A | 8/3/2019 | [x] | [x] | [x] | [x] | [x] | [x] | [x] | [x] | [x] | [ ] | [ ] | [ ] |
| A0002 | WORKFLOW SYSTEM DEVELOPMENT | USER B | 9/13/2019 | [x] | [x] | [x] | [x] | [x] | [x] | [ ] | [ ] | [ ] | [ ] | [ ] | [ ] |
| A0003 | ORDERING AND ORDER RECEIVING SYSTEM DEVELOPMENT | USER C | 9/20/2019 | [x] | [x] | [ ] | [ ] | [ ] | [ ] | [ ] | [ ] | [ ] | [ ] | [ ] | [ ] |
| A0004 | PRINTER DRIVER DEVELOPMENT | USER D | 8/20/2019 | [x] | [x] | [ ] | [ ] | [ ] | [ ] | [ ] | [ ] | [ ] | [ ] | [ ] | [ ] |
| A0005 | DRAWING OUTPUT SERVICE DEVELOPMENT | USER E | 8/6/2019 | [x] | [x] | [x] | [x] | [x] | [ ] | [x] | [x] | [x] | [ ] | [ ] | [ ] |

46 — BATCH OPERATION 5A, 5B, 5C, 5D, 5E — phase separator rows; 2A — table; 3 — document icon column; 4 — release section

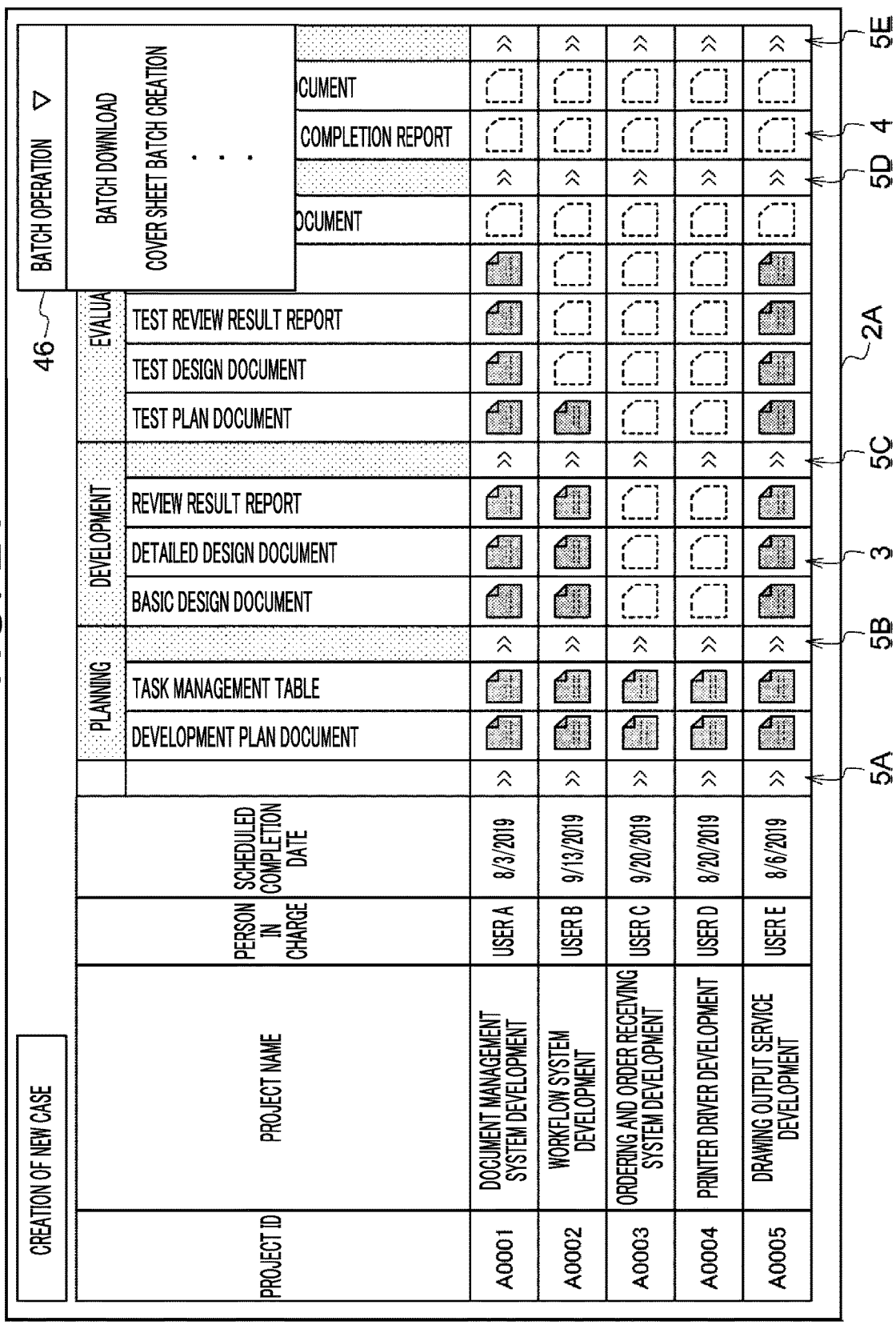

FIG. 22

SELECT BATCH OPERATION TARGET

| | PROJECT ID | PROJECT NAME | PERSON IN CHARGE | SCHEDULED COMPLETION DATE | PLANNING | | DEVELOPMENT | | | EVALUATION | | | | RELEASE | | |
|---|---|---|---|---|---|---|---|---|---|---|---|---|---|---|---|---|
| | | | | | DEVELOPMENT PLAN DOCUMENT | TASK MANAGEMENT TABLE | BASIC DESIGN DOCUMENT | DETAILED DESIGN DOCUMENT | REVIEW RESULT REPORT | TEST PLAN DOCUMENT | TEST DESIGN DOCUMENT | TEST REVIEW RESULT REPORT | TEST RESULT REPORT | QUALITY INSPECTION DOCUMENT | RELEASE PREPARATION COMPLETION REPORT | RELEASE APPROVAL DOCUMENT |
| ☒ | A0001 | DOCUMENT MANAGEMENT SYSTEM DEVELOPMENT | USER A | 8/3/2019 | ▣ | ▣ | ▣ | ▣ | ▣ | ▣ | ▣ | ▣ | ▣ | | | |
| ☒ | A0002 | WORKFLOW SYSTEM DEVELOPMENT | USER B | 9/13/2019 | ▣ | ▣ | ▣ | ▣ | ▣ | ▣ | | | | | | |
| ☒ | A0003 | ORDERING AND ORDER RECEIVING SYSTEM DEVELOPMENT | USER C | 9/20/2019 | ▣ | ▣ | | | | | | | | | | |
| ☒ | A0004 | PRINTER DRIVER DEVELOPMENT | USER D | 8/20/2019 | ▣ | ▣ | | | | | | | | | | |
| ☒ | A0005 | DRAWING OUTPUT SERVICE DEVELOPMENT | USER E | 8/6/2019 | ▣ | ▣ | ▣ | ▣ | ▣ | | | ▣ | ▣ | | | |

[SELECTION] [CANCEL]

FIG. 23

| PROJECT ID | STEP | STATE | PERSON IN CHARGE | DOCUMENT TYPE | DEGREE OF NECESSITY | SCHEDULED STORAGE DATE | DOCUMENT |
|---|---|---|---|---|---|---|---|
| ☐ A0001 | ☐ PLANNING | COMPLETED | USER A | DEVELOPMENT PLAN DOCUMENT (NOT AUTHORIZED) | REQUIRED | 6/20/2019 | DEVELOPMENT PLAN DOCUMENT.doc |
| | | | | TASK MANAGEMENT TABLE (NOT AUTHORIZED) | REQUIRED | 6/20/2019 | TASK MANAGEMENT TABLE_20190910.xlsx |
| | ☐ DEVELOPMENT | COMPLETED | USER F | BASIC DESIGN DOCUMENT | REQUIRED | 7/20/2019 | BASIC DESIGN DOCUMENT.md |
| | | | | DETAILED DESIGN DOCUMENT | REQUIRED | 7/20/2019 | DOCUMENT MANAGEMENT FUNCTION DESIGN DOCUMENT.md (1 OTHER) |
| | | | | | REQUIRED | 7/20/2019 | USER MANAGEMENT FUNCTION DESIGN DOCUMENT.md |
| | | | | REVIEW RESULT REPORT | REQUIRED | 7/20/2019 | DESIGN CODE REVIEW RESULT REPORT.xlsx (3 OTHERS) |
| | ☐ EVALUATION | DURING EXECUTION | USER G | TEST PLAN DOCUMENT | REQUIRED | 8/1/2019 | TEST PLAN DOCUMENT.doc |
| | | | | TEST DESIGN DOCUMENT | OPTIONAL | — | TEST DESIGN DOCUMENT.doc |
| | | | | TEST REVIEW RESULT REPORT | REQUIRED | 8/10/2019 | TEST REVIEW RESULT REPORT (2 OTHERS) |
| | | | | TEST RESULT REPORT | REQUIRED | 8/15/2019 | TEST RESULT REPORT.xlsx |
| | | | | QUALITY INSPECTION DOCUMENT | REQUIRED | 8/20/2019 | — |
| | ☐ RELEASE | BEFORE EXECUTION | USER B | RELEASE PREPARATION COMPLETION REPORT | REQUIRED | 9/10/2019 | — |
| | | | | RELEASE APPROVAL DOCUMENT | REQUIRED | 9/10/2019 | — |
| ☐ A0002 | ☐ PLANNING | COMPLETED | USER B | DEVELOPMENT PLAN DOCUMENT (NOT AUTHORIZED) | REQUIRED | 6/20/2019 | DEVELOPMENT PLAN DOCUMENT.doc |
| | | | | TASK MANAGEMENT TABLE (NOT AUTHORIZED) | REQUIRED | 6/20/2019 | TASK MANAGEMENT TABLE_20190810.xlsx |
| | ☐ DEVELOPMENT | COMPLETED | USER F | BASIC DESIGN DOCUMENT | REQUIRED | 7/20/2019 | BASIC DESIGN DOCUMENT.md |
| | | | | DETAILED DESIGN DOCUMENT | REQUIRED | 7/20/2019 | DOCUMENT MANAGEMENT FUNCTION DESIGN DOCUMENT.md (1 OTHER) |
| | | | | | REQUIRED | 7/20/2019 | USER MANAGEMENT FUNCTION DESIGN DOCUMENT.md |
| | | | | REVIEW RESULT REPORT | REQUIRED | 7/20/2019 | DESIGN CODE REVIEW RESULT REPORT.xlsx (3 OTHERS) |
| | ☐ EVALUATION | DURING EXECUTION | USER G | TEST PLAN DOCUMENT | REQUIRED | 8/1/2019 | TEST PLAN DOCUMENT.doc |
| | | | | TEST DESIGN DOCUMENT | OPTIONAL | — | — |
| | | | | TEST REVIEW RESULT REPORT | REQUIRED | 8/10/2019 | — |
| | | | | TEST RESULT REPORT | REQUIRED | 8/15/2019 | — |
| | | | | QUALITY INSPECTION DOCUMENT | REQUIRED | 9/1/2019 | — |
| | ☐ RELEASE | BEFORE EXECUTION | USER B | RELEASE APPROVAL DOCUMENT | REQUIRED | 9/10/2019 | — |

INFORMATION PROCESSING APPARATUS FOR PRESENTING AN OBJECT FOR A BATCH OPERATION WITHOUT SELECTION IN ADVANCE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-191398 filed Oct. 18, 2019.

BACKGROUND

1. Technical Field

The present disclosure relates to an information processing apparatus and a non-transitory computer readable medium.

2. Related Art

JP-A-2008-112279 discloses an information processing system including a document management unit that manages plural documents to each of which operation authority is given, a receiving unit that receives a processing request for a predetermined document group managed by the document management unit, a holding unit that holds handling contents when operation authorities given to documents included in the document group are different corresponding to the document group, and a control unit that controls processing on documents included in a document group based on the handling contents held in the holding unit when the operation authorities of the documents included in the document group which is a processing request target received by the receiving unit are different.

SUMMARY

In the information processing apparatus of the related art that manages an object such as a document, when plural objects are operated in a batch, for example, a user selects an object which is an operation target in advance from a folder or a search result after a search under a search condition designated by the user, and then executes a desired operation.

However, in this case, the user needs to determine whether or not each object included in an object list is an object which is an operation target, or to consider a search condition for narrowing down the objects which are operation targets, which may lower work efficiency.

Aspects of non-limiting embodiments of the present disclosure relate to providing an information processing apparatus and a non-transitory computer readable medium capable of presenting an object which is a target candidate for a batch operation without a user selecting in advance the object which is the target candidate for the batch operation from among plural objects.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: select an object which is a transmission candidate using (i) attributes of objects managed in a project including plural processes and (ii) an attribute of a user who instructs an operation relating to transmission of an object; generate, for the object which is the transmission candidate, image information obtained by imaging transmission information used for the transmission of the object; and output the generated image information.

BRIEF DESCRIPTION OF THE DRAWINGS

Exemplary embodiment(s) of the present disclosure will be described in detail based on the following figures, wherein:

FIG. 1 is a diagram illustrating an example of a list screen;

FIG. 2 is a diagram illustrating an example of a detail screen;

FIG. 3 is a view illustrating an example of a cover sheet;

FIG. 5 is a diagram illustrating an example of a user information table;

FIG. 6 is a diagram illustrating an example of an operation authority table;

FIG. 7 is a diagram illustrating an example of a case configuration information table;

FIG. 8 is a diagram illustrating an example of a step configuration information table;

FIG. 9 is a diagram illustrating an example of a document type configuration information table;

FIG. 10 is a diagram illustrating an example of a document configuration information table;

FIG. 11 is a diagram illustrating an example of a batch operation related table;

FIG. 12 is a diagram illustrating an example of a selection condition table;

FIG. 13 is a diagram illustrating an example of a configuration of a part of an electric system in the information processing apparatus;

FIG. 15 is a diagram illustrating an example of an operation screen;

FIG. 16 is a diagram illustrating an example of an attribute selection dialogue;

FIG. 17 is a diagram illustrating an example of an operation screen to which an attribute is added;

FIG. 18 is a diagram illustrating an example of a filtering dialogue;

FIG. 19 is a diagram illustrating an example of the operation screen after the attribute is filtered by an attribute condition set in the filtering dialogue;

FIG. 20 is a diagram illustrating an example of a list screen for performing a batch operation on plural projects as operation targets;

FIG. 21 is a diagram illustrating an example of a menu of batch operations to be executed for plural projects;

FIG. 22 is a diagram illustrating an example of a selection screen; and

FIG. 23 is a diagram illustrating an example of an operation screen of a batch operation for plural projects.

DETAILED DESCRIPTION

Figure 4:
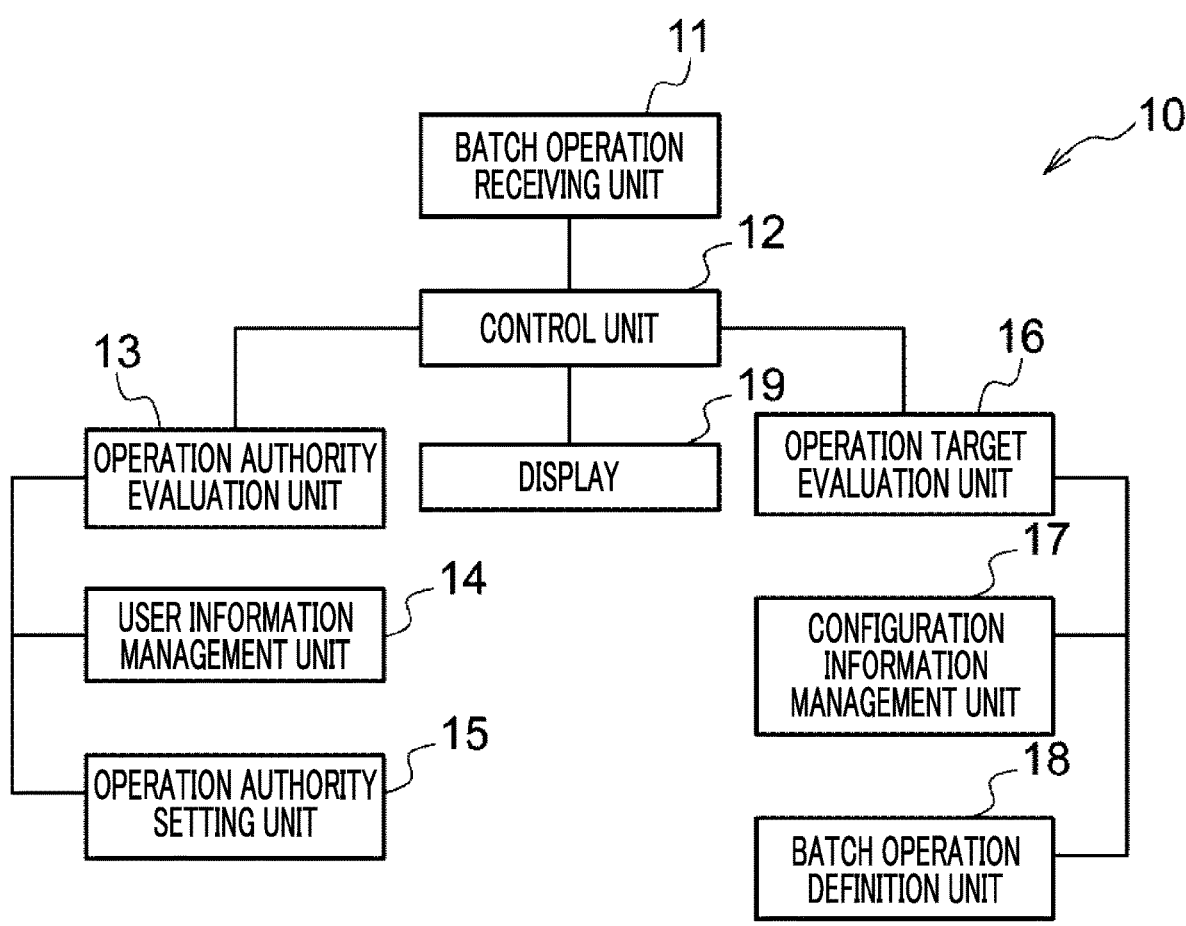
FIG. 4 is a diagram illustrating an example of a functional configuration of an information processing apparatus.

Hereinafter, this exemplary embodiment will be described with reference to the accompanying drawings. The same components and same processing are denoted by the same reference symbols throughout the drawings, and redundant description thereof will be omitted.

FIG. 1 is a diagram illustrating an example of a list screen 2 of a job application that is executed by an information processing apparatus 10 and indicates a registration status of a document created in a job process for each case based on a structure of the job process.

The job process prescribes a flow of processing to be executed from the start to the end of the job, a product generated in the job, and resources required to generate the product. The job process includes plural processes.

There is no limitation on a type of product generated in the job, and for example, a commodity may be a product, but hereinafter, as an example, various documents created for generating the commodity will be described as examples of the product generated in the job.

As illustrated in FIG. 1, individual job contents performed according to the job process, that is, a case is given attributes representing properties of the case, for example, such as a project ID, a project name, a person in charge, and a scheduled completion date.

The project ID represents an identifier for uniquely identifying the case, and the project name represents a name of the case. The person in charge indicates a person in charge of a group responsible for the case, and the scheduled completion date indicates a scheduled completion date of the case.

The case is also managed for each step representing a process of job. Since classification of steps is set for each job, there is no restriction on the classification, but in the example of FIG. 1, the steps are classified into respective steps of planning, development, evaluation, and release.

In each step, a document type generated during execution of the step is prescribed. The document type indicates a type of a generated document. In the example of FIG. 1, it is prescribed that a "development plan document" and an "task management table" are generated and managed in a planning step, a "basic design document", a "detailed design document", and a "review result report" are generated and managed in a development step, a "test plan document", "test design document", "test review result report", "test result report", and "quality inspection document" are generated and managed in an evaluation step, and a "release preparation completion report" and a "release approval document" are generated and managed in a release step.

When a document corresponding to the document type is created in each step, for example, the document is stored in a designated storage area by an upload operation from a person in charge of the case, and registration of the document for the case is completed.

In FIG. 1, an icon 3 which represents a shape of a document with a solid line indicates that the document corresponding to the document type is registered in a corresponding case and an icon 4 which represents the shape of the document with a dotted line indicates that the document corresponding to the document type is not registered in the corresponding case. That is, on the list screen 2, a registration status of the document associated with a case is displayed so that the case can be grasped at a glance for each case.

As described above, a type of a management target managed based on the job process is referred to as an "object type", and the case, step, document type, and document described above are examples of the object type. An entity of the management target managed based on the job process is referred to as an "object". Specifically, the job is an object of the job process, each project is an object of the case, and each process such as planning, development, evaluation, and release that constitutes the project is an object of a step. For example, the process document specifying a document type created in each process, such as the development plan document, is an object of the document type, and document data (also referred to as a "document file") of the document created as the process document is an object of the document.

As can be seen from the fact that the document data is correlated with the process document, the process document is correlated with the process, the process is correlated with the project, and the project is managed in correlation with the job, the information processing apparatus 10 hierarchizes and manages objects. The job is the object positioned at the highest rank in the hierarchy, and the objects are positioned at lower positions in the order of the project, the process, the process document, and the document data.

A user who operates the list screen 2 of the job application issues an instruction to execute a prescribed operation on at least one object of any type through the list screen 2.

For that reason, on the list screen 2, detail buttons 5A to 5E for displaying a detail screen 6 including detailed information of the object are displayed, and the detail screen 6 of an object corresponding to any of the detail buttons 5A to 5E selected by the user with a mouse or the like is displayed. The detail button 5A is a button for displaying the detail screen 6 of the project. The detail button 5B is a button for displaying the detail screen 6 for a planning process, the detail button 5C is a button for displaying the detail screen 6 for a development process, the detail button 5D is a button for displaying the detail screen 6 for an evaluation process, and the detail button 5E is a button for displaying the detail screen 6 for a release process. Hereinafter, when there is no need to distinguish and describe the detail buttons 5A to 5E, the detail buttons 5A to 5E will be described as the "detail button 5".

FIG. 2 is a diagram illustrating an example of the detail screen 6 displayed when the user selects the detail button 5A of a project whose project ID is represented by "A0002".

In the example of FIG. 2, buttons for executing operations of batch download and cover sheet batch creation are displayed for the project whose project ID is represented by "A0002". On the detail screen 6, attributes of the selected project are displayed. There are no restrictions on the attributes given to the objects, and the detail screen 6 in FIG. 2 merely illustrates an example of the attributes given to the project whose project ID is represented by "A0002".

A batch download operation is an operation for transmitting at least one or more registered document data managed by the information processing apparatus 10, of the document data belonging to each object having hierarchical rank lower than the designated object (in the example of FIG. 2, the project whose project ID is represented by "A0002") to a device designated in advance by one operation and enabling the designated device to acquire the document data.

The cover sheet batch creation operation is an operation for creating a cover sheet 7 used, for example, when contents of a document created on paper is converted into data using a device that optically reads characters and images such as a scanner and the contents of the document converted into data are uploaded to the information processing apparatus 10 as document data.

FIG. 3 is a diagram illustrating an example of the cover sheet 7. The cover sheet 7 includes code information obtained by encoding transmission information used for uploading to the job process, such as a QR code (registered trademark). Since the code information is represented as an image, the code information is an example of image information.

The transmission information used for uploading includes, for example, designation information of a storage area to be a storage destination of document data, a job name that specifies the job in which the document data is registered, a project ID that specifies the project in the job, and a document type name that specifies the document type in the project. The information processing apparatus 10 stores the document data correlated with the transmission information in the designated storage area according to the transmission information obtained from the code information read by the scanner, updates the registration status of the document data, and manages that the document data designated by the job name, the project ID, and the document type name is registered.

In the header of the cover sheet 7, information describing which cover sheet 7 is a cover sheet used for registering document data of what kind of job, which project, and which document type is displayed, and thus the user who performs the upload operation of the document data can complete the upload operation only by an operation of reading the document on which the cover sheet 7 containing the registration information of the document is placed with the scanner by reading the document with the scanner after placing the cover sheet 7 on the first page of the document that the user desires to upload.

In the above description, although an example of reading the contents of a document with a scanner is described, for example, the contents of the document may be captured by a camera having a communication function connected to a communication line such as the Internet, and the contents of the captured document are converted into document data by a known character recognition method. When capturing the contents of the document with the camera, the document may be captured as a moving image or a still image. The generated document data is uploaded to a storage destination designated by the cover sheet 7 via the information processing apparatus 10.

When uploading plural documents, if the user superimposes the documents on each other and causes the scanner to scan the documents after placing the cover sheet 7 containing the registration information of each document on the first page of each of the documents, the document data created from each of the documents is stored in the storage area designated by the code information of the cover sheet 7 placed at the top of the document by one reading operation, and registered in the information processing apparatus 10. That is, the cover sheet batch operation is an example of an operation relating to uploading. The operation relating to the uploading is an example of an operation relating to transmission of an object.

The designated destination of the storage area which is the storage destination of the document data does not necessarily need to be a folder provided in a storage device in the information processing apparatus 10, but may be a folder provided in the storage device within another external apparatus different from the information processing apparatus 10. In this case, the document data is uploaded to an external apparatus different from the information processing apparatus 10.

The upload of the document data does not necessarily require the cover sheet 7, and, for example, the document data may be uploaded by dragging and dropping an icon representing the document data, that the user desires to upload, by the user onto the icon 4 of the list screen 2 illustrated in FIG. 1. The icon representing document data is an example of image information.

Since information of the storage area is set for each process document of each process in the project, when the document data is dragged and dropped on the icon 4 corresponding to an unregistered process document, the information processing apparatus 10 grasps the project and the document type correlated with the uploaded document data from the position of the icon 4, stores the document data in the storage area set in the icon 4, and completes the upload of the document data. Since plural pieces of document data may be registered in one process document, the information processing apparatus 10 may upload the document data even when the document data is dragged and dropped on the icon 3 corresponding to the registered process document.

FIG. 4 is a diagram illustrating an example of a functional configuration of the information processing apparatus 10. As illustrated in FIG. 4, the information processing apparatus 10 includes functional units of a batch operation receiving unit 11, a control unit 12, an operation authority evaluation unit 13, a user information management unit 14, an operation authority setting unit 15, an operation target evaluation unit 16, a configuration information management unit 17, a batch operation definition unit 18, and a display 19.

The batch operation receiving unit 11 receives an object (origin object) notified by the user selecting the detail button 5 corresponding to any object from the list screen 2, operation contents of the batch operation selected by the user on the detail screen 6 of the origin object, and identification information (user ID) for identifying the user who instructs the batch operation.

When the origin object and the operation contents of the batch operation for the origin object are notified from the batch operation receiving unit 11, the control unit 12 controls other functional units included in the information processing apparatus 10 so that the instructed batch operation is performed on the objects, which are under the origin object and satisfy the selection condition correlated with the operation contents of the batch operation, using the origin object as the highest rank in the hierarchy of the objects, that is, the origin of the object. The object under the origin object is an object having hierarchical rank lower than the origin object.

The operation authority evaluation unit 13 cooperates with the user information management unit 14 and the operation authority setting unit 15, which will be described later, to evaluate, for each object under the origin object, whether or not the user who instructs the batch operation is a permitted user who is given the operation authority for the object.

The user information management unit 14 manages user information of the user who performs the batch operation on the objects using a user information table 30.

FIG. 5 is a diagram illustrating an example of the user information table 30. As illustrated in FIG. 5, the user information table 30 manages user attributes, such as user ID, user name, gender, affiliated department, position, and affiliated group, for each user. The attributes of the user managed in the user information table 30 are not limited to the attributes illustrated in FIG. 5, and may include other attributes necessary for operation.

The operation authority setting unit 15 manages the operation authority using an operation authority table 31.

FIG. 6 is a diagram illustrating an example of the operation authority table 31. As illustrated in FIG. 6, the operation authority table 31 includes, for example, an object type, an operation type, and an executable condition.

In the operation authority table 31, for each combination of each object represented by the object type and the operation contents of each operation executed by the information processing apparatus 10, the condition of the permitted user is prescribed in an executable condition field. In the example of the operation authority table illustrated in FIG. 6, the first row prescribes that the user who is a person in charge of the planning process or has an authority of a manager or more is the permitted user of the QR cover sheet creation operation for the test plan document.

The operation target evaluation unit 16 acquires, from the configuration information management unit 17 described below, configuration information of the objects under the origin object for which the batch operation is instructed and evaluates, for each object under the origin object, whether or not the object is a candidate for an operation target of the instructed batch operation, based on the selection condition defined by the batch operation definition unit 18.

The configuration information management unit 17 manages configuration information of an object for each object type managed by the information processing apparatus 10. The configuration information of the object is a set of information related to the object, and includes, for example, information indicating a hierarchical relationship of the object, an attribute of the object, a state of the object, and the operation contents executable for the object.

FIG. 7 is a diagram illustrating an example of a case configuration information table 32A managed by the configuration information management unit 17. As illustrated in FIG. 7, the case configuration information table 32A includes configuration information, for example, a project ID, attribute information of a project, a step indicating processes of the project, and an operation that prescribes the operation contents operable for the project.

FIG. 8 is a diagram illustrating an example of a step configuration information table 32B managed by the configuration information management unit 17. As illustrated in FIG. 8, the step configuration information table 32B includes configuration information such as a project ID of a project including the process, a step representing a specific process in the project, attribute information of the process, a document type of a document which is a management target in the process, and an operation that prescribes the operation contents operable for the process.

FIG. 9 is a diagram illustrating an example of a document type configuration information table 32C managed by the configuration information management unit 17. As illustrated in FIG. 9, the document type configuration information table 32C includes configuration information, for example, a project ID of a project to which a process document belongs, a step indicating a process in which a document is managed in the project, a document type of the managed document, attribute information of the document, an operation that prescribes the operation contents operable for the document, and a document name in which a file name of the registered document is set when the document is registered.

FIG. 10 is a diagram illustrating an example of a document configuration information table 32D managed by the configuration information management unit 17. As illustrated in FIG. 10, the document configuration information table 32D includes configuration information, for example, a project ID of a project to which a document belongs, a step indicating a process in which the document is managed in the project, a document type of the document to be managed, a document name in which a file name of the registered document is set, an approval state in which the result of an approval work that confirms that the registered document is a formal document is set, and an operation that prescribes the operation contents operable for the document. The document name and the approval status of the document are examples of attributes of the document.

As described above, the information processing apparatus 10 manages the configuration information of the objects to be managed according to a hierarchy. The configuration information managed in the case configuration information table 32A, the step configuration information table 32B, the document type configuration information table 32C, and the document configuration information table 32D is not limited to the configuration information illustrated in FIGS. 7 to 10, and may include other configuration information required for an operation. For example, in the document type configuration information table 32C, a scheduled storage date indicating a guideline for the registration deadline of the process document may be managed as attribute information.

Hereinafter, tables for managing the configuration information of each object belonging to the project, such as the case configuration information table 32A, the step configuration information table 32B, the document type configuration information table 32C, and the document configuration information table 32D, are collectively referred to as "configuration information table 32".

The batch operation definition unit 18 defines the operation contents of a single operation constituting the batch operation, and also defines selection information for selecting an object which is an operation target candidate for each object type.

FIG. 11 is a diagram illustrating an example of the batch operation related table 36 managed by the batch operation definition unit 18. As illustrated in FIG. 11, the batch operation related table 36 includes, for example, a batch operation field in which an operation name of a batch operation executable in the information processing apparatus 10 is set and a single operation field in which an operation name of a single operation constituting the batch operation is set. In the example of the batch operation related table 36 in FIG. 11, the first row defines that the batch download operation is implemented by executing a download operation for one document file for each document data which is an operation target of the batch download operation. The second row defines that the cover sheet batch creation operation is implemented by executing a cover sheet creation operation for creating the cover sheet 7 for one document data for each document data which is an operation target of the cover sheet batch creation operation.

FIG. 12 is a diagram illustrating an example of a selection condition table 37 managed by the batch operation definition unit 18. As illustrated in FIG. 12, the selection condition table 37 includes, for example, a single operation field indicating an operation name of a single operation, an operation target field indicating an object type which is an operation target of the single operation, and a selection condition field for selecting an object which is an operation target candidate for each object type.

The selection condition is prescribed using at least one of an attribute of an object related to the operation contents and an attribute of a user who instructs the batch operation.

FIG. 13 is a diagram illustrating an example of a configuration of a part of an electric system in the information processing apparatus 10. As illustrated in FIG. 13, the information processing apparatus 10 is configured using, for example, a computer 20.

The computer 20 includes a central processing unit (CPU) 21, which is an example of a processor which is responsible for processing of each functional unit according to the information processing apparatus 10 illustrated in FIG. 4, a read only memory (ROM) 22 which stores an information processing program that causes the computer 20 to function as the information processing apparatus 10, a random access memory (RAM) 23 used as a temporary work area of the CPU 21, a nonvolatile memory 24, and an input/output interface (I/O) 25. The CPU 21, the ROM 22, the RAM 23, the nonvolatile memory 24, and the I/O 25 are connected to each other via a bus 26.

The nonvolatile memory 24 is an example of a storage device in which stored data is maintained even when power supplied to the nonvolatile memory 24 is cut off, and as the nonvolatile memory 24, for example, a semiconductor memory is used, but a hard disk may be used. The nonvolatile memory 24 does not necessarily need to be built in the computer 20, and may be a portable storage medium that can be attached to and detached from the computer 20, such as a universal serial bus (USB) memory or a memory card.

For example, a communication unit 27, an input unit 28, and a display unit 29 are connected to the I/O 25.

The communication unit 27 is connected to a communication line, and is provided with a communication protocol for performing data communication with an external apparatus connected to the communication line.

The input unit 28 is a unit that receives an instruction from a user and notifies the CPU 21 of the instruction. For example, as the input unit 28, a button, a touch panel, a keyboard, a mouse, and the like are used. When the instruction is given by voice, a microphone may be used as the input unit 28.

The display unit 29 is a device that outputs information processed by the CPU 21, and, as the display unit 29, for example, a liquid crystal display, an organic electro luminescence (EL) display, a projector, or the like is used.

The units connected to the I/O 25 of the computer 20 are not limited to the units illustrated in FIG. 13. For example, when the information processing apparatus 10 is incorporated in an image forming apparatus, an image forming unit that forms an image on a recording medium and a scanner are connected to the I/O 25. For convenience of explanation, although description will be made assuming that the information processing apparatus 10 and the image forming apparatus are installed independently of each other, and the information processing apparatus 10 and the image forming apparatus are connected by a communication line, an apparatus in which the functions of the information processing apparatus 10 are incorporated in the same housing and which is integrated with the information processing apparatus 10 is also an example of the information processing apparatus 10.

Next, the operation of the information processing apparatus 10 will be described.

Figure 14:
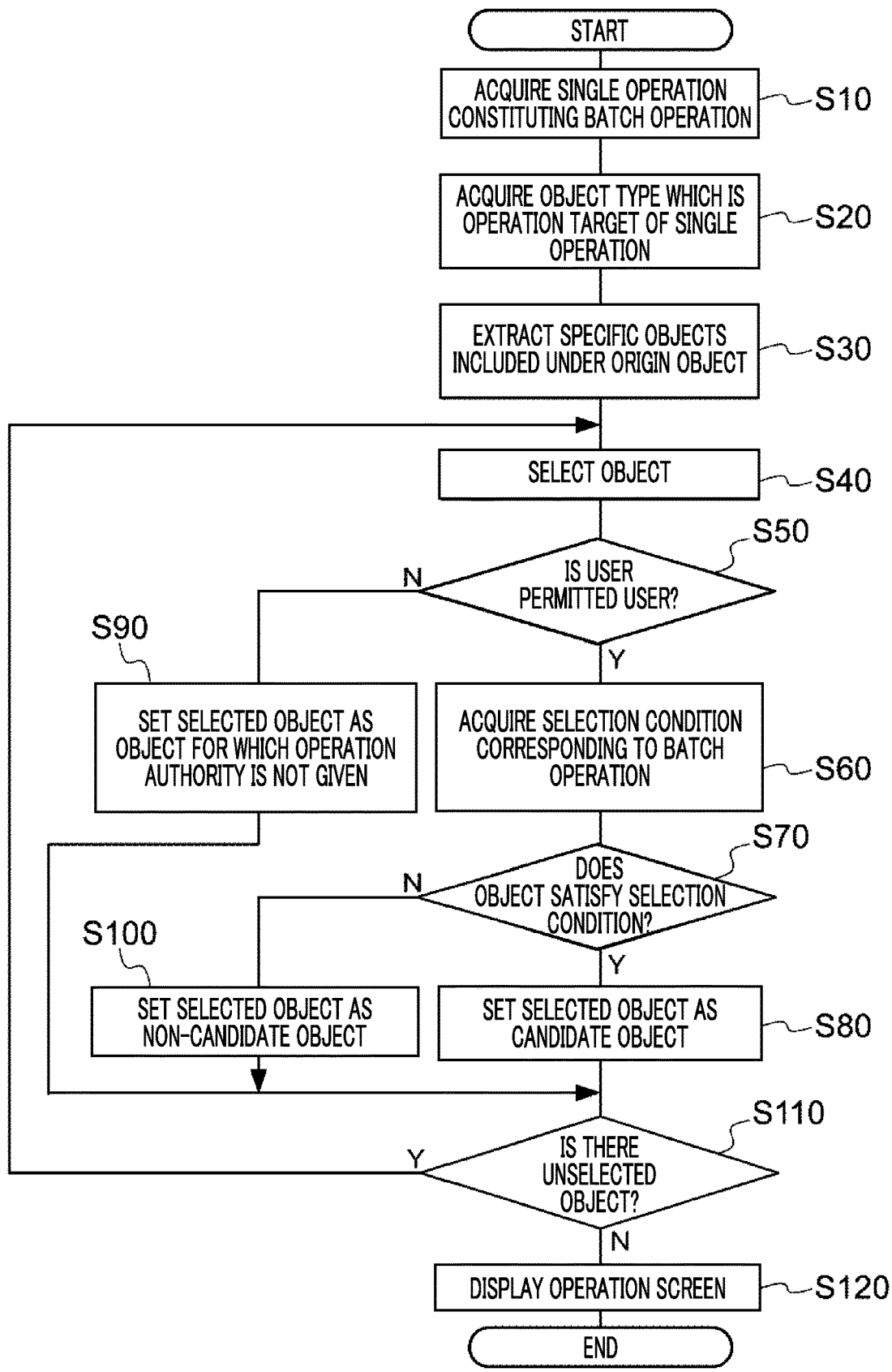
FIG. 14 is a flowchart illustrating an example of a flow of batch operation processing.

FIG. 14 is a flowchart illustrating an example of the flow of batch operation processing executed by the CPU 21 of the information processing apparatus 10 when the user instructs any batch operation on the detail screen 6 of the origin object selected from the list screen 2 as illustrated in FIG. 2.

The information processing program that prescribes batch operation processing is stored in advance in, for example, the ROM 22 of the information processing apparatus 10. The CPU 21 of the information processing apparatus 10 reads the information processing program stored in the ROM 22, and executes the batch operation processing.

In step S10, the CPU 21 refers to the batch operation related table 36 and acquires a single operation constituting the received batch operation.

In step S20, the CPU 21 refers to the selection condition table 37 and acquires the object type prescribed as an operation target of the single operation acquired in step S10.

In step S30, the CPU 21 refers to the configuration information table 32 and extracts all the objects belonging to the object type acquired in step S20, which are objects under the origin object, as specific objects.

In step S40, the CPU 21 selects any one object from the specific objects extracted in step S30. The object selected in step S40 is referred to as a "selected object". The selected object is an example of an object related to the operation contents.

In step S50, the CPU 21 acquires the attribute of the user who instructs the batch operation from a user information table 30 using a user ID of the user who instructs the batch operation on the detail screen 6. As the user ID of the user who instructs the batch operation, for example, a user ID input by the user in authentication processing for starting a job application executed by the information processing apparatus 10 is used.

Furthermore, the CPU 21 refers to the operation authority table 31 and acquires an executable condition corresponding to the combination of the selected object and the single operation acquired in step S10. For example, when the selected object is a test plan document and the operation type of single operation is cover sheet creation, the executable condition corresponds to the combination of the first row of the operation authority table 31 illustrated in FIG. 6, and thus "a person who is in charge of the planning process or has an authority of a manager or more" is acquired as the executable condition.

Then, the CPU 21 compares the acquired attribute of the user with the executable condition, and determines whether or not the user who instructs the batch operation is a permitted user who has operation authority for the instructed batch operation. When the user who instructs the batch operation is the permitted user, the CPU 21 proceeds to step S60.

In step S60, the CPU 21 refers to the selection condition table 37 and acquires a selection condition correlated with the operation contents of the single operation acquired in step S10. For example, if the operation contents of the single operation are to create cover sheet, the selection condition such as "["degree of necessity" of document type is "required"] and [number of documents stored in document type=0] and [person in charge of step includes login user]" is acquired. The term "and" in the selection condition is a regular expression representing a logical product. The expression "degree of necessity of document type is required" means that the document type is required to be registered in the project, and "the number of documents stored in the document type=0" means that no process document corresponding to the designated document type is registered.

The contents of the selection condition correlated with each operation contents is an example, and the selection condition is set and corrected by a user having setting authority.

In step S70, the CPU 21 refers to the configuration information table 32, acquires the attribute of the selected object, and determines whether or not the selected object satisfies the selection condition acquired in step S60, using at least one of the acquired attribute of the selected object and the attribute of the user acquired in step S50. When it is determined that the selected object satisfies the selection condition, the CPU 21 proceeds to step S80.

In this case, since the selected object satisfies a condition as an operation target for the batch operation instructed by the user, in step S80, the CPU 21 sets the selected object as a candidate object which is an operation target of the batch operation, and proceeds to step S10.

On the other hand, when it is determined, in determination processing of step S50, that the user who instructs the batch operation is not the permitted user, the CPU 21 proceeds to step S90.

In this case, since the user who instructs the batch operation does not have the operation authority for the selected object in the first place, in step S90, the CPU 21 sets the selected object as an object for which the user does not have the operation authority, and proceeds to step S110.

When it is determined, in determination processing in step S70, that the selected object does not satisfy the selection condition, the CPU 21 proceeds to step S100.

In this case, although the user who instructs the batch operation has the operation authority for the selected object, the selected object does not satisfy the condition as the operation target for the batch operation instructed by the user. Accordingly, in step S100, the CPU 21 sets the selected object as a non-candidate object which is not an operation target of the batch operation, and proceeds to step S110.

In step S110, the CPU 21 determines whether or not there is an unselected object, which is not selected in step S40, in the specific objects extracted in step S30.

When it is determined that there is an unselected object, the CPU 21 proceeds to step S40 and selects an unselected object from the specific objects and updates the selected object.

By repeatedly executing processing of steps S40 to S110 until it is determined, in determination processing of step S110, that there is no unselected object, each object extracted as the specific object is classified into a candidate object, a non-candidate object, or an object for which the user does not have operation authority.

On the other hand, when it is determined, in determination processing of step S110, that there is no unselected object, the CPU 21 proceeds to step S120.

In step S120, the CPU 21 displays, on the display unit 29, an operation screen 8 displayed, for each object extracted as the specific object, so as to allow the user to understand whether the object is a candidate object, a non-candidate object, or an object for which the user does not have operation authority, and ends the batch operation processing illustrated in FIG. 14.

FIG. 15 is a diagram illustrating an example of the operation screen 8 displayed on the display unit 29 by processing of step S120 in FIG. 14. Here, as an example, a description will be made using the operation screen 8 when the cover sheet batch creation is instructed for a project whose project ID is represented by "A0002", as illustrated in FIG. 2. That is, in this case, the project whose project ID is represented by "A0002" is the origin object.

On the operation screen 8, all the specific objects belonging to the object type prescribed as the operation target of the batch operation are displayed so that a hierarchical relationship of the objects can be understood. As illustrated in FIG. 12, since the object type which is an operation target of the cover sheet batch creation is a document type, on the operation screen 8 illustrated in FIG. 15, the process document (for example, "development plan document") belonging to the process is displayed and the file name (for example, "development plan document.doc") of the document data is displayed in correlation with each process document for each process of the designated project.

The CPU 21 displays the check box 40 on the operation screen 8 in correlation with each process document and when the object is an object for which the user does not have the operation authority, that is, a process document for which the user does not have the operation authority, the CPU 21 disables the corresponding check box 40. In FIG. 15, a shaded check box 40 indicates a disabled check box 40. The CPU 21 may not only disable the check box 40 but also display, for example, supplementary information regarding the operation authority for the object such as "(not authorized)" next to a process document for which the user is not authorized.

In the case of a process document set as a candidate object, the CPU 21 sets a check mark in the corresponding check box 40, and displays the operation screen 8 in a state where the process document is selected in advance as an operation target of the cover sheet batch creation. In the case of a process document set as a non-candidate object, the CPU 21 displays the operation screen 8 in a state where the process document is not selected in advance as the operation target of the cover sheet batch creation without setting a check mark in the corresponding check box 40.

Furthermore, in order to distinguish and clearly display the candidate object and the non-candidate object, the CPU 21 may change not only the setting of the check marks in the check box 40 corresponding to the candidate object and the non-candidate object but also, for example, at least one of font type, font size, or font decoration for the notation of the candidate object and the notation of the non-candidate object on the operation screen 8.

As described above, the CPU 21 distinguishes whether each of the objects having a hierarchical rank lower than the origin object is the candidate object or the non-candidate object, hierarchizes the objects having the hierarchical rank lower than the origin object and displays the objects on the operation screen 8, and presents the candidate objects which are operation targets of the batch operation to the user.

When the user presses a create button 8A on the operation screen 8, the CPU 21 transmits an image forming instruction for the cover sheet 7 to the image forming apparatus via the communication unit 27 so as to generate the cover sheet 7 for each object (In this case, a process document) for which a check mark is set in the corresponding check box 40. On the other hand, when the user presses a cancel button 8B on the operation screen 8, the CPU 21 stops the instructed batch operation (In this case, the cover sheet batch creation).

When the user desires to add an object which is an operation target of the batch operation, if the user sets a check mark in the check box 40 corresponding to the object that the user desires to add, the candidate object which is an operation target of the batch operation presented by the CPU 21 and the object added by the user are finally set as objects which are the operation targets of the batch operation.

As described above, since the objects are hierarchized and displayed on the operation screen 8, when a check mark is set in the check box 40 corresponding to an object of hierarchically higher rank, the check mark is automatically set by the CPU 21 also in the check box 40 corresponding to each object having a hierarchical rank lower than the object for which the check mark is set. Conversely, when the check mark is removed from the check box 40 corresponding to the object of hierarchically higher rank, the check mark is also automatically removed from the check box 40 corresponding to each object having a hierarchical rank lower than the object from which the check mark is removed. With this configuration, operability of the user is improved as compared with the case where the user individually sets and deletes the check mark of the check box 40 corresponding to the object.

On the operation screen 8, an attribute button 8C is displayed in each of title fields representing the object types, for example, "step" and "document type". When the user presses any of the attribute buttons 8C, the CPU 21 displays an attribute selection dialogue 9 for selecting display or non-display of the attribute of the object for the corresponding object type on the operation screen 8.

Figure 16:
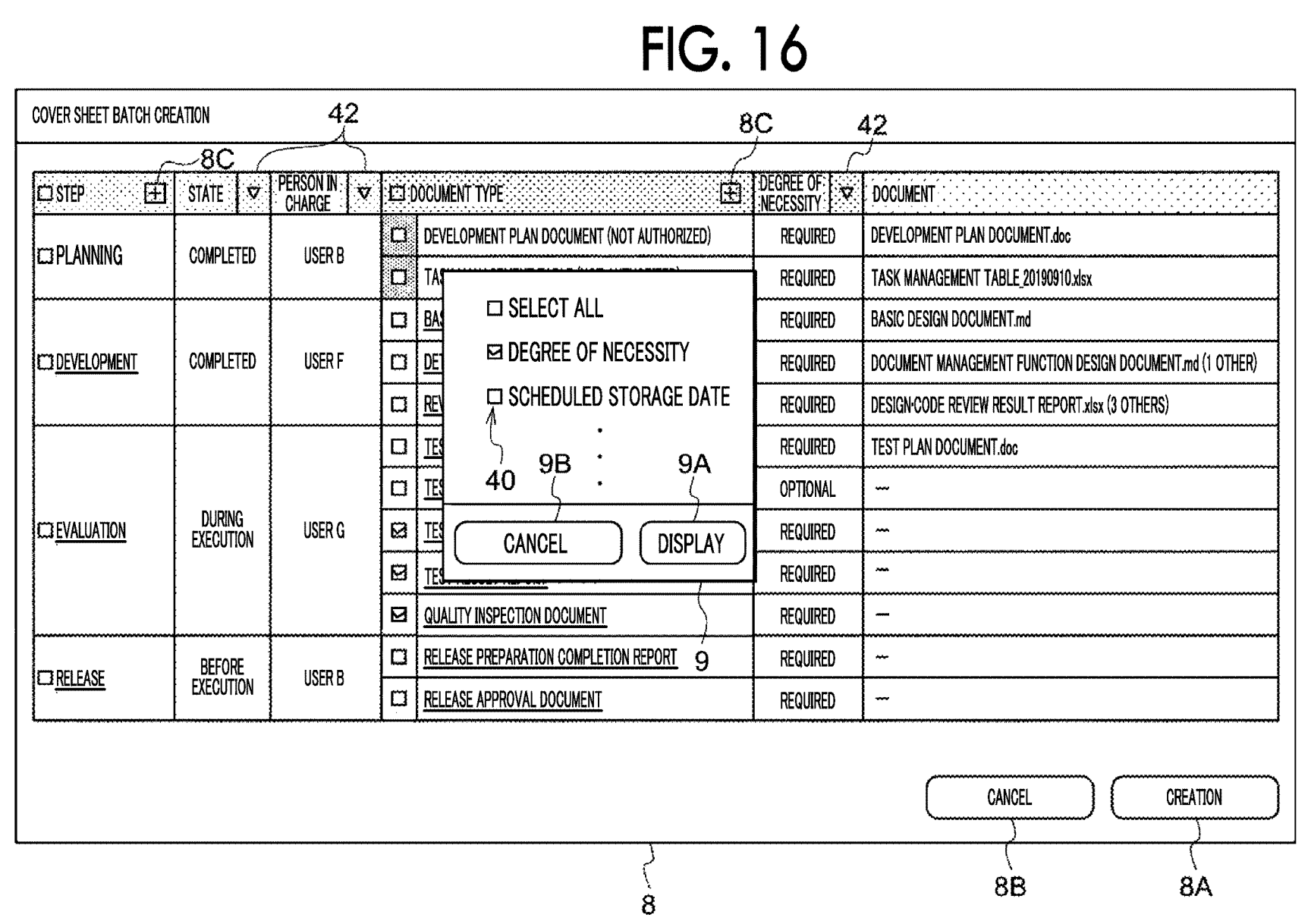

FIG. 16 is a diagram illustrating an example of the attribute selection dialogue 9. In the attribute selection dialogue 9, in a state where a check mark is set in advance in the check box 40 corresponding to the attribute name displayed on the operation screen 8, the attribute names of all the objects of the designated object type are displayed together with the check box 40.

When the user sets a check mark in the check box 40 corresponding to the attribute name that the user desires to newly display on the operation screen 8 and presses a display button 9A, the CPU 21 adds, to the operation screen 8, a display column for displaying the attribute corresponding to the attribute name for which the check mark is set. When the user removes the check mark already set in the check box 40 and presses the display button 9A, the CPU 21 deletes the display column for displaying the attribute corresponding to the attribute name, from which the check mark is removed, from the operation screen 8. When the user presses a cancel button 9B, the CPU 21 closes the attribute selection dialogue 9 without changing display of the operation screen 8.

FIG. 17 is a diagram illustrating an example of the operation screen 8 after setting the scheduled storage date to be newly displayed on the operation screen 8 in the attribute selection dialogue 9 for the document type object, that is, the process document. As illustrated in FIG. 17, the scheduled storage date for each of the process documents is displayed on the operation screen 8.

As illustrated in FIG. 17, a filter button 42 is displayed in a title field indicating the attribute name of each object, for example, such as "person in charge" or "degree of necessity", on the operation screen 8. When the user presses the filter button 42 of any attribute, the CPU 21 displays a filtering dialogue 44 for filtering the attribute of an object (hereinafter referred to as "designated object") correlated with the pressed filter button 42 on the operation screen 8.

FIG. 18 is a diagram illustrating an example of the filtering dialogue 44 displayed when the user presses the filter button 42 corresponding to the scheduled storage date which is the attribute of the process document. In the filtering dialogue 44, all attribute conditions for filtering attributes are described. A check box 40 is correlated with each attribute condition, and when displaying the filtering dialogue 44, the CPU 21 displays the filtering dialogue 44 in a state where a check mark is set in the check box 40 corresponding to the attribute condition, that is already set, in advance.

When the user sets a check mark in the check box 40 corresponding to the attribute condition and presses an OK button 44A, the CPU 21 extracts an object having an attribute value that satisfies the attribute condition for which the check mark is set, from among the designated objects (In this case, "process document") belonging to the hierarchy designated by the user. As illustrated in FIG. 18, when plural attribute conditions such as "before today" and "this month" are set for the scheduled storage date, the CPU 21 extracts an object that satisfies an attribute condition prescribed by a logical product of set attribute conditions, specifically, a process document whose scheduled storage date is earlier than today and which is set as during this month.

When the user presses a cancel button 44B, the CPU 21 closes the filtering dialogue 44 without changing the display on the operation screen 8.

FIG. 19 is a diagram illustrating an example of the operation screen 8 displayed after the attribute condition, that "person in charge" which is the attribute of the process is the user (also referred to as a "login user") who instructs the cover sheet batch operation and "scheduled storage date" which is the attribute of the process document is "before today", is set for the operation screen 8 of FIG. 17.

As illustrated in FIG. 19, the CPU 21 extracts an object satisfying the attribute condition and objects having a hierarchical rank lower than the object satisfying the attribute condition among the objects of the project whose project ID is represented by "A0002" and then, re-hierarchizes the extracted objects according to a hierarchy of the objects and displays the extracted objects on the operation screen 8. Since only the hierarchy including the object satisfying the attribute condition is displayed on the operation screen 8, the operability of the user is improved as compared with the case where an object which is an operation target of a batch operation is selected from the operation screen 8 in which all objects included under the origin object are displayed as illustrated in FIG. 17.

In the attribute selection dialogue 9, the attribute condition which are set in advance are displayed, but the attribute condition are added, changed, and deleted by the user.

When the document data is uploaded using the cover sheet created in a batch in this way, the CPU 21 stores the document data in the designated storage area according to the transmission information obtained from the code information received together with the document data, and sets registration information of the process document designated by the job name, project ID, and document type name included in the transmission information as "registered".

In the above description, the example in which the batch operation is performed using one project as the origin object is described, but the information processing apparatus 10 also supports the batch operation in which plural projects are set as operation targets.

FIG. 20 is a diagram illustrating an example of a list screen 2A for performing a batch operation on plural projects as operation targets.

On the list screen 2A, similarly to the operation screen 8 illustrated in FIG. 1, the registration status of process documents for each process in all projects managed by the information processing apparatus 10 is displayed, but a batch operation button 46 is separately provided.

When the user presses the batch operation button 46, a batch operation menu prepared in the information processing apparatus 10 as illustrated in FIG. 21 is displayed.

When the user selects any operation from the batch operation menu, a selection screen 48 for selecting an object, which is an operation target of the selected batch operation as illustrated in FIG. 22, is displayed.

The check boxes 40 are respectively correlated with the objects displayed on the selection screen 48, and the user sets or removes the check mark of the check box 40 to select an object which is an operation target of the batch operation. The object corresponding to the check box 40 for which the check mark is set becomes the operation target of the batch operation, and the object corresponding to the check box 40 from which the check mark is removed is excluded from the operation target of the batch operation.

FIG. 22 is an example of the selection screen 48 displayed when the user selects the cover sheet batch creation. Since the check box 40 is correlated with each project and each process document in each process, process documents for creating the cover sheet 7 can be selected in a batch for plural projects. For example, when a check mark is set in the check box 40 corresponding to each of the project IDs "A0003" and "A0004" and a check mark is set in the check box 40 corresponding to the basic design document, the cover sheets 7 of the respective basic design documents with the project IDs "A0003" and "A0004" are created in a batch.

When it is desired to select all process documents belonging to a specific process, the process documents under the process are selected in a batch by selecting the process name. For example, when the user selects "development" on the selection screen 48, a check mark is set in the check box 40 correlated with each of the process documents of the basic design document, the detailed design document, and the review result report under the development object. Conversely, when the user selects a process name for which all check marks are set in the check boxes 40 corresponding to respective process documents under the process, the check mark of the check box 40 correlated with each process document is removed, and the selection of each process document under the process is canceled.

After selecting the object which is an operation target of the batch operation, the user presses a selection button 48A to fix the selected object.

FIG. 23 is a diagram illustrating an example of an operation screen 8Z displayed after the selection button 48A is pressed.

When the CPU 21 receives the object selected on the selection screen 48 and the operation contents of the batch operation in response to pressing of the selection button 48A, the CPU 21 executes the batch operation processing illustrated in FIG. 14 and distinguishes whether each object is the candidate object or the non-candidate object and displays the objects on the operation screen 8Z.

Since information on all the objects under the projects managed by the information processing apparatus 10 is displayed on the operation screen 8Z, the display tends to be complicated as the number of projects and the object types increase. For that reason, the operation screen 8Z is provided with, for example, a check box 40A for selecting whether or not to display only the checked rows. When a check mark is set in the check box 40A, the CPU 21 re-hierarchizes only the objects designated by the user by setting the check mark on the operation screen 8Z and the objects having a hierarchical rank lower than the designated object according to a hierarchy, and displays the objects on the operation screen 8Z. That is, the CPU 21 displays only the hierarchy including the objects designated by the user on the operation screen 8Z. The information on an object is information concerned with the object, such as the object itself and the attribute of the object.

A fold button 50 is displayed for each project ID in the project ID field of the operation screen 8Z, and when the fold button 50 is pressed by the user, the CPU 21 folds a display row of a project corresponding to the pressed fold button 50 so as not to display information on each object included under the project corresponding to the pressed fold button 50. When the display row of the project is folded, the CPU 21 performs a display indicating that the display row of the project is folded, for example, a display in which the thickness of the frame line is changed. If the user presses the display with a mouse or the like, the CPU 21 displays the folded display row of the project on the operation screen 8Z again.

Although the batch operation processing has been described by taking the cover sheet batch creation operation as an example, the batch operation also includes, for example, a data batch transmission operation. The data batch transmission operation is an operation of transmitting information on an object managed by the information processing apparatus 10 to an external apparatus, and is an example of an operation relating to upload.

The information processing apparatus 10 executes, for example, the batch operation processing illustrated in FIG. 14 on the origin object, with the object selected by the user on the list screen 2 illustrated in FIG. 1 as the origin object and selects a candidate object that satisfies the selection information correlated with the data batch transmission operation from the objects under the origin object. The information processing apparatus 10 transmits an object finally selected by the user as an operation target of the data batch transmission operation to a transmission destination determined for each object in advance, based on the selected candidate object.

The information processing apparatus 10 may be implemented as a cloud server using cloud computing, and if the transmission destination of the object is set to another cloud server, an operation of transmitting the candidate object which is an operation target of the batch operation presented by the information processing apparatus 10 to the another cloud server is performed. That is, batch operation processing of the information processing apparatus 10 according to this exemplary embodiment is also applied to data transmission from a cloud server to a cloud server.

If the information processing apparatus 10 is implemented as an on-premises server in a building of an organization that operates the information processing apparatus 10, data transmission from the on-premises server to the cloud server is implemented.

Furthermore, the batch operation processing illustrated in FIG. 14 may be applied to an optical device that optically reads the contents of a document, such as a camera or a scanner and an object selected by the user based on the candidate object presented by the optical device may be transmitted to information equipment used by an individual such as a smartphone, a tablet computer, and a wearable terminal.

The present disclosure has been described with reference to the exemplary embodiment, but is not limited to the scope described in the exemplary embodiment. Various alterations or improvements can be made to the exemplary embodiment without departing from the gist of the present disclosure, and the exemplary embodiment to which the alterations or improvements are made are also included in the technical scope of the present disclosure. For example, the order of processing may be changed without departing from the gist of the present disclosure.

In the exemplary embodiment, although a mode in which the batch operation processing is implemented by software has been described as an example, processing equivalent to the flowchart illustrated in FIG. 14 may be installed in an application specific integrated circuit (ASIC), a field programmable gate array (FPGA), or programmable logic device (PLD), and may be processed by hardware. In this case, the processing speed is increased as compared with the case where the batch operation processing is implemented by software.

As described above, the CPU 21 may be replaced by a dedicated processor such as the ASIC, the FPGA, the PLD, a graphics processing unit (GPU), and a floating point unit (FPU) specialized for specific processing.

The operation of the CPU 21 in the exemplary embodiment may be implemented by plural CPUs 21 in addition to the mode implemented by one CPU 21. Furthermore, the operation of the CPU 21 in the exemplary embodiment may be implemented by cooperation of the CPU 21 in the computer 20 located at a physically distant position.

Also, in the exemplary embodiment described above, a form in which the information processing program is installed in the ROM 22 has been described, but is not limited thereto. The information processing program according to the present disclosure can be provided in a form recorded on a computer-readable storage medium. For example, the information processing program may be provided in a form recorded on an optical disc such as a compact disc (CD)-ROM or a digital versatile disc (DVD)-ROM. The information processing program according to the present disclosure may be provided in a form recorded in a portable semiconductor memory such as a USB memory or a memory card.

Furthermore, the information processing apparatus 10 may acquire an information processing program from an external apparatus connected to a communication line via the communication unit 27.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
select an object which is a transmission candidate using (i) attributes of objects managed in a project including a plurality of processes and (ii) an attribute of a user who instructs an operation relating to transmission of an object;
generate, for the object which is the transmission candidate, image information obtained by imaging transmission information used for the transmission of the object; and
output the generated image information,
wherein the attributes of the objects managed in the project include a registration status to the project and a degree of necessity for registration.

2. The information processing apparatus according to claim 1, wherein
the processor is configured to:
select a plurality of the objects that are the transmission candidates; and
generate the image information for each of the selected objects in a batch.

3. The information processing apparatus according to claim 1, wherein when the user is given operation authority for the operation relating to the transmission of the object, the processor selects an object that is not registered in the project but is required to be registered in the project, as the transmission candidate.

4. An information processing apparatus comprising:
a processor configured to:
register an object which is a transmission candidate correlated with transmission information as an object of a destination designated by the transmission information according to the transmission information obtained from image information that is obtained by imaging information used for transmission of an object that is generated using (i) attributes of objects managed in a project including a plurality of processes and (ii) an attribute of a user who instructs an operation relating to the transmission of the object,
wherein the attributes of the objects managed in the project include a registration status to the project and a degree of necessity for registration.

5. The information processing apparatus according to claim 4, wherein
the processor is configured to:
select a plurality of the objects that are the transmission candidates; and
generate the image information for each of the selected objects in a batch.

6. An information processing apparatus comprising:
a processor configured to:
receive an object type and operation contents to be executed in a batch on a plurality of objects belonging to the object type, from a user; and
display an object satisfying a selection condition among objects related to the operation contents, on an operation screen as a candidate object that is an operation target of the operation contents together with a non-candidate object estimated as not the operation target of the operation contents, wherein
the selection condition is prescribed using at least one of (i) an attribute of the objects related to the operation contents or (ii) an attribute of the user who instructs the operation contents, and
the selection condition is correlated with the operation contents.

7. The information processing apparatus according to claim 6, wherein
the processor is configured to:
hierarchize and manage objects; and
distinguish whether each of objects having a hierarchical rank lower than the object belonging to the received object type is the candidate object or the non-candidate object, and thereafter hierarchize the objects having the hierarchical rank lower than the objects belonging to the object type and displays the objects on the operation screen.

8. The information processing apparatus according to claim 7, wherein
the processor is configured to:
receive an attribute condition of an object belonging to a hierarchical rank designated by the user;
extract an object satisfying the attribute condition from the plurality of objects belonging to the designated object type;
re-hierarchize the extracted object and objects having a hierarchical rank lower than the extracted object; and
display the re-hierarchized objects on the operation screen.

9. The information processing apparatus according to claim 7, wherein the processor is configured to:
- re-hierarchize an object designated by the user on the operation screen and objects having a hierarchical rank lower than the designated object; and
- display the re-hierarchized objects on the operation screen.

10. The information processing apparatus according to claim 9, wherein
the processor is configured to:
- display only a hierarchical rank including the object designated by the user, on the operation screen.

11. The information processing apparatus according to claim 6, wherein when the user is not a permitted user who is given operation authority of the operation contents for an object, the processor performs control such that the user does not select the object for which the operation authority is not given as the candidate object on the operation screen.

12. The information processing apparatus according to claim 11, wherein the permitted user is prescribed for each combination of an object and the operation contents.

* * * * *